July 14, 1942.   C. F. WALLACE   2,289,611
CONTROL DEVICE AND SYSTEM
Filed March 23, 1939
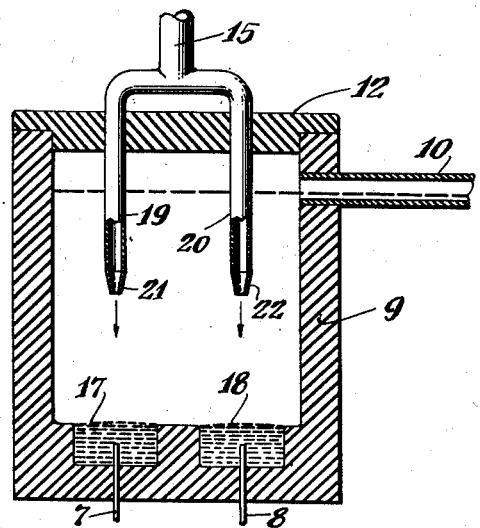
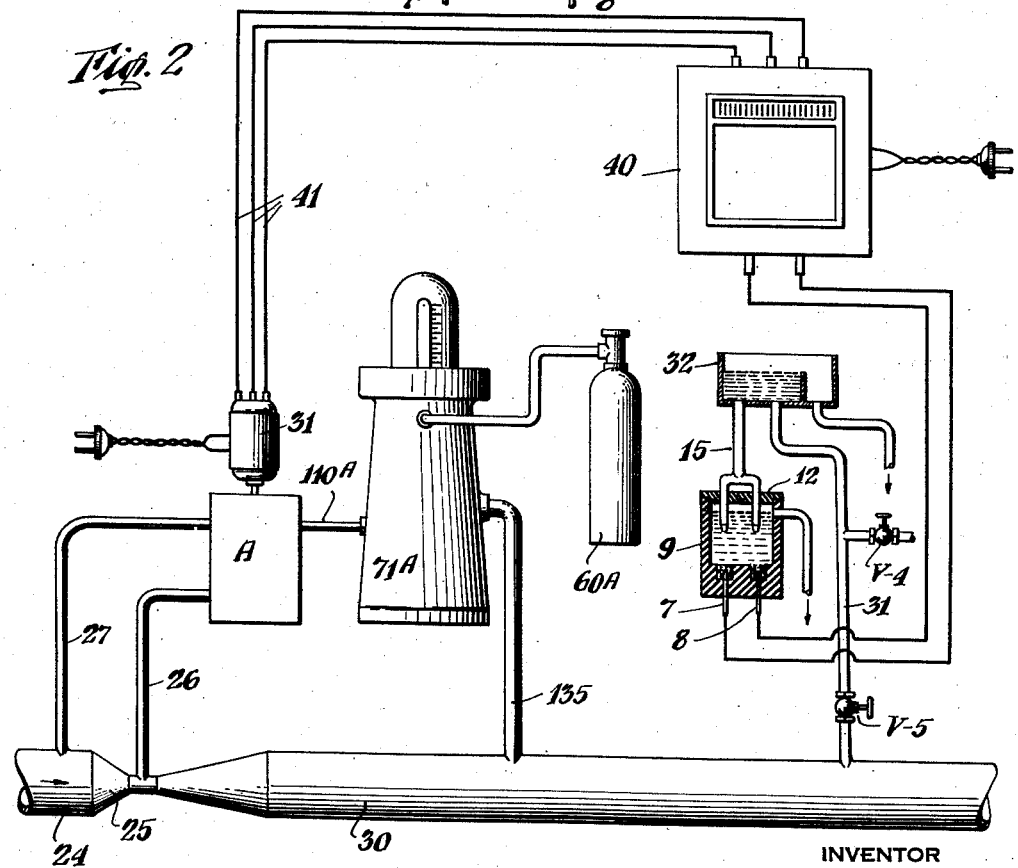
INVENTOR
Charles F. Wallace
BY
Cooper, Kerr & Dunham
his ATTORNEYS Patented July 14, 1942

2,289,611

UNITED STATES PATENT OFFICE 2,289,611

CONTROL DEVICE AND SYSTEM

Charles F. Wallace, Westfield, N. J., assignor to Wallace & Tiernan Products, Inc., Belleville, N. J., a corporation of New Jersey Application March 23, 1939, Serial No. 263,661

12 Claims. (Cl. 210—28)

This invention relates to methods of and means for detecting changes in composition of liquids.

One of the objects of the invention is to provide a novel cell for converting changes in composition in a liquid into changes in electromotive force between the electrodes of the cell.

Another object of the invention is to provide a cell of the class referred to which is sensitive, reliable, simple in construction, and substantially uniform and steadfast in its operation.

A further object of the invention is to provide a novel system for indicating changes in composition of a liquid, or controlling the composition of a liquid, or both.

Other objects and advantages will appear as the invention is hereinafter described.

Referring to the drawing, which illustrates what I now consider to be a preferred form of apparatus for practicing the invention:

Fig. 1 is a somewhat diagrammatic sectional elevation of a cell constituting part my invention.

Fig. 2 is a wiring diagram showing a system of indication and control in accordance with my invention.

While my invention is capable of other uses and of use in other environments, it is especially suitable for use in connection with the treatment of water, such as drinking water, sewage, etc., by chlorination. I have therefore shown, and shall describe an application of the invention to such a system.

In Letters Patent of the United States No. 1,944,803, patented January 23, 1934, for Water treatment, on application filed by Georg Ornstein, there is disclosed a system in which one electrode is in contact with liquid, such as sewage, before treatment thereof, and another electrode is in contact with the same liquid after treatment with chlorine; the difference of potential between the electrodes being employed to indicate, or regulate, the chlorine content in the treated liquid. In Letters Patent of the United States No. 2,076,964, patented April 13, 1937, for Process and apparatus for water purification, on application filed by Richard Pomeroy, there is disclosed a system similar in many respects to that of the cited Ornstein patent, but differing therefrom by utilizing a reference electrode, or half cell, instead of an electrode exposed to the untreated liquid, in conjunction with the electrode in contact with the treated liquid. In another United States patent, No. 1,944,804, patented of even date with the above cited Patent No. 1,944,803, Ornstein proposed to lead treated liquid to a cell in two branches, in one of which he provided a dechlorinator, each branch leading to a corresponding one of two compartments in the cell, separated by a porous septum, and there being an electrode in each compartment.

My invention, even when employed in connection with the chlorination of water, differs essentially from those of Ornstein and Pomeroy in a number of respects.

I employ two electrodes both of which are subjected to the same liquid having the same composition; whereas Ornstein uses one electrode in contact with liquid which has not been chlorinated, or which has been dechlorinated, and another electrode in contact with the treated (chlorinated) liquid, and Pomeroy uses a half cell in conjunction with an electrode exposed to the chlorinated liquid. Systems embodying my invention are therefore simpler than those of Ornstein and Pomeroy.

Ornstein and Pomeroy both proposed to use a solid electrode exposed to the treated liquid. Such electrodes so employed become dirty, slimy, inactivated and otherwise chemically reacted upon, thereby causing the sensitivity and operation of the cell and system to vary. Moreover, such cells so operated, are difficult to calibrate and it is difficult to maintain the desired accuracy of indication or control without repeated inspection, supervision, and attention. My invention also overcomes these objections and shortcomings.

The cell which I have invented comprises two dissimilar liquid metallic electrodes. For example, one electrode, 17, may be of mercury and the other, 18, of mercury and silver amalgam, contained in cavities or pockets in the bottom of the container 9 which is made of suitable insulating material. Platinum lead in wires 7 and 8 are provided for establishing electrical contact with the respective electrodes 17 and 18. Treated liquid is introduced into the cell through a pipe 15 and leaves the cell through an overflow pipe 10. Means are also provided for maintaining the surfaces of the fluid electrodes 17, 18, clean, fresh, and sensitive. While separate and other means may be employed within the scope of my invention, I prefer to utilize the means for introducing the liquid into the cell as the cleansing means for the electrode surfaces. Thus the inlet pipe 15 is shown provided with two branch pipes 19, 20, which extend through the cover or lid 12 of the cell and are vertically adjustable therein, and which terminate in nozzles 21, 22, within the cell. When liquid under suitable pressure is supplied through the pipe 15, the jets or streams issuing from the nozzles 21, 22 impinge upon the centers of the upper exposed surfaces of the respective electrodes 17, 18, thereby so agitating the fluid metallic electrode surfaces as to maintain them clean and therefore substantially constant or uniform in their behavior and operational characteristics. The pipe 15 and its branches 19 and 20 are of suitable material such as glass or hard rubber.

The streams or jets of liquid issuing from the nozzles 21, 22 drive straight down without undue spreading until they strike the surfaces of the respective fluid metallic electrodes 17, 18, thereby agitating the surfaces of the fluid metallic electrodes, and the liquid which has been introduced through the pipe 15 ultimately exits at the overflow 10.

A satisfactory embodiment of this now preferred form of my cell is constructed so as to have jet or nozzle openings each of about .1" diameter, with the nozzles 21, 22, located about 1⅝" above the upper surfaces of the underlying fluid electrodes 17, 18, and employing fluid metallic electrodes 17, 18, which are each about 1½" in diameter; the pressure of the liquid supplied at 15 may be that commonly employed in city water mains but preferably is obtained from a constant level box, such as that shown in Fig. 2, or other suitable means for insuring constant pressure if and when the pressure in the main fluctuates. In operation, each jet of liquid impinges upon the underlying surface of the respective electrodes 17, 18, so that the central superficial portion of each of the electrode surfaces lying directly under its jet, and approximately ½" in diameter, is depressed due to the velocity of the impinging jet. The remaining annular area of the upper surface of each fluid metallic electrode is continually filled with more or less concentric ripples which shift in position.

To obtain maximum scouring action on the mercury surface, the agitation produced by each jet may approach the condition in which the fluid metallic electrode surface would be broken by the impinging jet. Minor fluctuations take place in the fluid metallic electrode surface directly under each jet. With this optimum arrangement and adjustment, the surfaces of the fluid metallic electrodes remain unbroken in spite of the agitation thereof.

The presence of chlorinated water in the cell causes a difference of potential to exist between the dissimilar electrodes 17, 18. This difference in potential may be correlated to the chlorine concentration of the liquid in the cell. If the composition of the liquid changes, i. e. if the residual chlorine content of the treated liquid changes due to a change in its biochemical oxygen demand, the difference of potential at 7—8 correspondingly changes. Within limits, voltage read across the wires 7—8 may be correlated to the amount of residual chlorine available in the water after its treatment.

Cells embodying my invention respond quickly to changes in the composition of the liquid such as changes in the chlorine concentration. When a change in concentration occurs, the changed liquid is brought immediately into contact with the fluid electrode surfaces by the impinging action of the jets which convey the treated liquid into the cell. It is not necessary that the treated liquid in the cell be completely swept out before a change of composition (concentration) produces a change in voltage across the conductors 7—8.

If the nozzles 21, 22 are lowered to such an extent that the impact of the jets breaks the fluid metallic electrode surface, erratic results may result. While I believe that this may be due to frictional effects, I am not certain as to the exact cause. Readings taken under these conditions often show relatively little sensitivity and poor reproducibility. As the jets are moved back (up) from this position the sensitivity to chlorine and the steadiness of the readings both increase. In the particular cell described, maximum sensitivity occurs when the nozzles are about 1½ inches above the mercury surfaces. Above that point no increase is noted up to two inches or more. However, when the nozzles are placed this far above the mercury surfaces the jets do not have their desired scouring effect and the cell begins to lose efficiency. This scouring effect combined with the agitation of the mercury surface, when the design and adjustments are proper, tends to keep the surface free from the effects of polarization, and to wash away impurities which may form as a result of chemical action between the liquid metallic electrodes and the liquid which constitutes the electrolyte.

By changing the size of the nozzles or jets the optimum height and optimum size of the cell and electrodes change in proportion. The size of the nozzles is also related to the amount of liquid flowing through them and, generally, for optimum operating conditions, the distance between nozzles and the electrode surfaces increases with the amount of liquid flowing through the nozzles. In many forms of practical apparatus, the amount of liquid fed through the nozzles is limited by the nozzle size and the rather small amount of pressure head available to maintain constant flow. It is important that the flow of the supplied liquid be maintained between limits of about 5% if accuracy is to be maintained.

Having described what I now consider a preferred form of cell, I shall now describe a satisfactory form of the remainder of a system employing the cell for the purpose of indicating, or controlling, or indicating and controlling, the chlorination of water.

Referring now to Fig. 2, which is somewhat diagrammatic but sufficiently informative to those skilled in the art, the water to be treated is supplied through a water main 24 from a suitable source, such as a reservoir, not shown, whence it flows through a Venturi tube 25 to the delivery main 30. Chlorine solution is supplied to the delivery main 30 through the pipe 135 from the vacuum chlorinator 71A which in turn obtains its supply of chlorine gas from the cylinder 60A. For details of the apparatus 24—25—26—27—60A—71A—A—135 see United States Patent No. 1,777,987, patented October 7, 1930, for "Apparatus for treating water" on application filed by me on November 30, 1927, Serial No. 236,853. As set forth in the last cited patent, the apparatus there disclosed is provided with adjusting means (specifically an adjustable valve 140) for varying the ratio between the rate of supply of chlorine and the rate of flow of water to which the chlorine is supplied. According to the present invention, a suitably controlled reversible motor 31 may be employed to effect the adjustment just mentioned.

In order that proportionality be automatically maintained between the amount of water flowing in the main 30 and the amount of chlorine gas in solution applied to the main 30 through the pipe 135, the differential converter A is connected across the high and low pressure pipes 27 and 26 of the venturi 25 so that a vacuum proportional to the square of the flow of water through the main 30 will be applied to the metering instrumentalities of the chlorinator 71A through the pipe 110A, and thereby cause the application of chlorine through the pipe 135 to be directly proportional to the flow of water in the main 30. For details of the differential converter A and related parts, reference may be had to United States Patent No. 1,762,706, patented June 10, 1930, for "Apparatus for producing a proportionately varying negative pressure," on application filed by me November 30, 1927, Serial No. 236,852.

The last cited patent (No. 1,762,706) discloses an arrangement in which an adjustable orifice 26 is provided. When embodied in the present invention, the adjustment of the said orifice is effected automatically by the motor 31. As disclosed in the last cited patent, the said adjusting means varies the ratio between the rate of supply of chlorine and the rate of flow of water to which the chlorine is supplied.

If the differential converter A is to be operated from Pitot tubes (see 37 in Fig. 6 of Patent No. 1,762,706) instead of from the venturi 25, the pressure differential applied to the differential converter A may be too small to permit the use of a motor driven adjustable orifice. In that event, the motor 31 may be utilized to vary the ratio between the rate of supply of chlorine and the rate of flow of water by adjusting the position of a fulcrum such as that shown at 17 in Fig. 6 of Patent No. 1,762,706, or, as stated above, to adjust a valve such as the valve 140 disclosed in the other cited patent—No. 1,777,987.

On the downstream side of the chlorine-supplying pipe 135, the main 30 supplied chlorinated water under pressure through a sample line 31 to a constant level box 32 which supplies the chlorinated water through the pipe 15 (see also Fig. 2) to the cell 9 etc., at a constant head. Excess supplied water flows from the constant level box 31 to waste.

The leads or conductors 7 and 8 of the cell 9 are connected to a suitable translating device which in turn so controls the motor 31 as to cause a greater ratio of chlorine to be supplied to the main 30 when the voltage across 7—8 is below a predetermined value, and to cause a lesser ratio of chlorine to be supplied to the main 30 when the voltage across 7—8 is above the predetermined value. In this manner, the residual chlorine content of the water undergoing treatment is automatically maintained substantially constant as desired. The translating device for effecting the desired control may be a conventional recording potentiometer 40 which is adapted to control the reversible motor 31 through the leads or conductors 41. If the voltage across the cell leads 7—8 is in agreement with the setting, nothing occurs. If the voltage across 7—8 is too high (i. e. above the predetermined voltage), a control contact (not shown) in the recorder 40 is closed, thereby causing the motor 31 to run in such direction as to effect an adjustment, as above described, to decrease the ratio of chlorine, supplied through the pipe 135, to the water to which it is supplied. Conversely, if the voltage across 7—8 is too low (i. e. below the predetermined voltage) the recorder exercises reverse control on the motor 31 to cause the chlorine ratio to be increased. In this way, and by these means, the cell 9 etc., through its connected instrumentalities, acts as a trimmer on the automatic flow proportioning apparatus which controls the flow of chlorine in proportion to the volume of water passing the point of application.

The pipe 31 is shown provided with a valve V—5 and a tap containing a valve V—4 through which untreated water (or tap water) may be supplied when the valve V—4 is open and the valve V—5 is closed, for the purpose of calibrating the cell and system and for cleaning the cell when desired. In normal operation, the valve V—4 will be closed and the valve V—5 will be open.

In the foregoing description, I have referred to the translating device 40 as a conventional recording potentiometer. Such devices are now on the market. This potentiometer may be of the type illustrated in Fig. 122, section 3, page 286, or described in section 3, paragraphs 284, and 285, on pages 282, 283 of the Standard Handbook for Electrical Engineers, sixth edition, published by the McGraw-Hill Company; or it may be of the general type disclosed in United States Patent No. 1,530,833, patented March 24, 1925, on application of E. A. Keeler.

The potential developed between a metallic electrode and a liquid with which it is in contact, is theoretically dependent only upon the character of the electrode and the character of the contacting liquid. Practically, however, this potential is influenced by a variety of other factors such as the cleanliness of the electrode surface, polarization effects, and the cumulative action of materials, contained in the liquid, upon the electrode. Because of these disturbing factors, the potential obtained too often and too widely departs from the theoretically correct value in some cases, thereby rendering the detection of change in the composition of the liquid unreliable and uncertain, as, for example, when sterilization of water by chlorine is being effected, indicated and/or controlled.

Cells embodying one or more electrodes, according to my invention, avoid these disturbing factors by constantly exposing a clean electrode surface to the liquid whose change in composition is being detected. When used in conjunction with a system for sterilization of water, using chlorine, the potential obtained is substantially proportional to the chlorine concentration up to a certain point, after which the proportionality changes, but nevertheless a reproducible curve is obtained. This curve, plotted between chlorine concentration and potential, is affected by the presence of ammonia, which may raise or lower the calibration of an instrument connected with the cell, but other materials or ingredients appear to affect it to only a minor extent. A test for chlorine is to use orthotolidin and to obtain the chlorine reading colorimetrically. That test is affected by the presence of other things, such as manganese. In water containing manganese, the orthotolidin test often shows a residual chlorine reading higher than that which actually exists, and sometimes shows an apparent residual when no active chlorine is present in fact, in which case sterilization of the water is not effected. Cells embodying my invention are practically insensitive to manganese and therefore would not falsely indicate the presence of active chlorine under conditions which might promote a false indication when a colorimetric indicator is used.

It therefore appears that cells embodying my invention may in many cases be relied upon to develop electrical potentials which are more truly proportional to the killing rate of bacteria than have been obtainable with prior methods and practices. This is of especial importance in the sterilization of drinking water.

Observations made in connection with the use of cells, each using two of my novel electrodes, in sterilization systems in which chloramines are formed by the reaction of ammonia with chlorine in the water, appear to support the conclusion that the potentials developed may not only be employed to detect changes in the residual chlorine but also certain changes in the supply of ammonia.

Claims to certain inventions disclosed herein are asserted in my copending applications Serial Nos. 263,659 and 263,660, filed of even date herewith.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use within the scope of the appended claims.

What I claim is:

1. In a system of the class described, in combination, means for treating a liquid to change its composition, and means comprising dissimilar fluid metallic electrodes exposed to the treated liquid for detecting changes in composition of the latter by changes in voltage across said electrodes.

2. In a system of the class described, in combination, a cell including dissimilar fluid metallic electrodes for electrically detecting changes in composition of a treated liquid, and means for impinging jets of the liquid whose change in composition is to be detected, upon the contact surfaces of said electrodes.

3. In a system of the class described, in combination, liquid-supporting means, dissimilar fluid metallic electrodes, means mounting said electrodes for contact with a liquid in said supporting means, whose change in composition is to be detected, and means for agitating surfaces of the electrodes which are in contact with the liquid.

4. In a system of the class described, in combination, a plurality of dissimilar fluid metallic electrodes; and means including means for squirting streams of a liquid, whose change in composition is to be detected, against contact surfaces of said electrodes, for producing a difference of electrical potential across said electrodes.

5. The method of detecting changes in composition of an electrolyte which method comprises exposing dissimilar fluid metallic electrodes to the electrolyte, while maintaining electrolytic connection through said electrolyte and between the electrodes, to create a difference in electrical potential, detecting said difference in potential, and agitating the contact surfaces of the electrodes to attain sensitivity in the electrical operation of the electrodes.

6. The method of detecting changes in composition of an electrolyte which method comprises exposing surfaces of dissimilar fluid metallic electrodes of the electrolyte, maintaining a continuous body of the electrolyte between the electrodes, detecting difference in electrical potential between the electrodes, and projecting jets of the same electrolyte through the electrolyte into contact with the surfaces of the electrodes.

7. In a system of the class described, in combination, means for supplying chlorine to water, means including a plurality of dissimilar fluid metallic electrodes adapted to exhibit different potentials in a common electrolyte and exposed to the chlorinated water, for establishing a voltage across said electrodes, corresponding to the condition of the chlorinated water, and means controlled by the voltage across said electrodes for governing the operation of the first mentioned means.

8. In a system of the class described, in combination, means for treating water to modify its composition, electrical cell means for testing the treated water, including means for displacing the water from the treating means to and through the cell means, and a plurality of dissimilar fluid metallic electrodes exposed to a common body of the treated water while the latter is in motion, and means for utilizing differences of potential across said electrodes in detecting changes in composition of the treated water.

9. In a system of the class described, in combination, means for treating flowing liquid, a plurality of dissimilar fluid metallic electrodes, means receiving the treated flowing liquid and including means exposing said electrodes to the treated flowing liquid, for establishing connection through said liquid, between the electrodes, and means controlled by change in the voltage across said electrodes for varying the treatment of the liquid by the first mentioned means.

10. In a system of the class described, in combination, an electrolytic cell having dissimilar fluid metallic electrodes and adapted to receive a flowing electrolyte common thereto, means for detecting changes in voltage across said electrodes, and means controlled thereby and including electrolyte treating means, for causing changes in the voltage across said electrodes to produce changes in the composition of the electrolyte prior to its entry into the cell.

11. In a system of the class described, in combination, means for treating a liquid to change its composition, and a cell comprising dissimilar liquid metallic electrodes exposed to and connected through the treated liquid for detecting changes in composition of the latter by changes in voltage across said electrodes.

12. In a system of the class described, in combination, an electrolytic cell having dissimilar liquid metallic electrodes and means including electrolyte-displacing means, for presenting a common flowing electrolyte to and in a continuous body thereof between both of said electrodes, and means for detecting changes in composition of the electrolyte by changes in voltage across said electrodes.

CHARLES F. WALLACE.